(12) United States Patent
Huang et al.

(10) Patent No.: US 12,150,911 B2
(45) Date of Patent: Nov. 26, 2024

(54) AIR CONNECTION PIPING DEVICE FOR A MASSAGE POOL, A POOL BODY OF A MASSAGE POOL AND A MASSAGE POOL

(71) Applicant: Intex Marketing Ltd., Tortola (VG)

(72) Inventors: Zhi Xiong Huang, Fujian (CN); Ai Ming Tan, Fujian (CN)

(73) Assignee: Intex Marketing Ltd., Tortola (VG)

( * ) Notice: Subject to any disclaimer, the term of this patent is extended or adjusted under 35 U.S.C. 154(b) by 0 days.

(21) Appl. No.: 18/578,263

(22) PCT Filed: Jul. 15, 2022

(86) PCT No.: PCT/IB2022/056542
§ 371 (c)(1),
(2) Date: Jan. 10, 2024

(87) PCT Pub. No.: WO2023/286029
PCT Pub. Date: Jan. 19, 2023

(65) Prior Publication Data
US 2024/0261181 A1    Aug. 8, 2024

(30) Foreign Application Priority Data
Jul. 15, 2021    (CN) .......................... 202121613803.6

(51) Int. Cl.
*A61H 33/02*    (2006.01)
(52) U.S. Cl.
CPC ....... *A61H 33/02* (2013.01); *A61H 2033/023* (2013.01)
(58) Field of Classification Search
CPC .. A61H 33/02; A61H 33/028; A61H 33/6005; A61H 2033/023
See application file for complete search history.

(56) References Cited

U.S. PATENT DOCUMENTS 3,810,464 A * 5/1974 Sheeler ............. B01F 23/23121
601/167
4,566,443 A    1/1986 Bucher
(Continued)

FOREIGN PATENT DOCUMENTS

CN    1596864 A    3/2005
CN    2794505 Y    7/2006
(Continued)

OTHER PUBLICATIONS

International Search Report and Written Opinion issued by the International Searching Authority, dated Oct. 14, 2022, for International Patent Application No. PCT/IB2022/056542; 8 pages.
(Continued)

*Primary Examiner* — Erin Deery
(74) *Attorney, Agent, or Firm* — Faegre Drinker Biddle & Reath LLP

(57) ABSTRACT

An air connection pipeline device of a massage pool may comprise a pipeline. The pipeline may be formed with a first air connection passage and a second air connection passage. The first air connection passage may have a first air inlet and a first air outlet. The first air connection passage may include a check valve located between the first air inlet and the first air outlet. The check valve may be driven to open when the air flow moves from the first air inlet to the first air outlet and close when reversely. The second air connection passage may be provided with a switch valve. The switch valve may comprise a second valve core and a second elastic body. The second valve core may slide between a closed position to close the second air connection passage and an open position to open the second air connection passage. The second elastic body may press against the second valve core. An initial state of the second valve core may be the closed position.

13 Claims, 6 Drawing Sheets

(56) References Cited

U.S. PATENT DOCUMENTS

| | | | |
|---|---|---|---|
| 4,773,104 | A | 9/1988 | Wang |
| 4,981,543 | A | 1/1991 | Popovich et al. |
| 5,283,915 | A | 2/1994 | Idland et al. |
| 5,809,942 | A | 9/1998 | Kralovec et al. |
| 6,003,166 | A | 12/1999 | Hald et al. |
| 6,108,829 | A | 8/2000 | Wadsworth |
| 6,199,224 | B1 | 3/2001 | Versland |
| 6,357,059 | B1 | 3/2002 | Lau |
| 6,412,123 | B1 | 7/2002 | Lau |
| 7,334,274 | B2 | 2/2008 | Wang |
| 7,503,082 | B2 * | 3/2009 | Castellote ............ A61H 33/02 137/389 |
| 11,179,733 | B1 | 11/2021 | Wang et al. |
| 2005/0050627 | A1 | 3/2005 | Ayeni et al. |
| 2006/0115248 | A1 | 6/2006 | Tran |
| 2006/0260038 | A1 | 11/2006 | Lau |
| 2011/0010836 | A1 | 1/2011 | Lau |
| 2012/0124732 | A1 | 5/2012 | Lau |
| 2018/0231283 | A1 | 8/2018 | Willers et al. |
| 2022/0241148 | A1 | 8/2022 | Wang |
| 2022/0325546 | A1 | 10/2022 | Lin et al. |

FOREIGN PATENT DOCUMENTS

| | | |
|---|---|---|
| CN | 202732280 U | 2/2013 |
| CN | 109424221 | 3/2019 |
| CN | 111895140 A | 11/2020 |
| CN | 112443180 A | 3/2021 |
| CN | 112502498 | 3/2021 |
| EP | 0168822 A2 * | 1/1986 |
| EP | 0967446 A2 | 12/1999 |
| JP | 2006-308009 A | 11/2006 |
| JP | 4041132 | 1/2008 |
| WO | 2015/010058 | 1/2015 |
| WO | 2021/042966 | 3/2021 |

OTHER PUBLICATIONS

International Preliminary Report on Patentability issued by the International Preliminary Examining Authority, dated Jun. 5, 2023, for International Patent Application No. PCT/IB2022/056542; 15 pages.

* cited by examiner

AIR CONNECTION PIPING DEVICE FOR A MASSAGE POOL, A POOL BODY OF A MASSAGE POOL AND A MASSAGE POOL

RELATED APPLICATIONS

The present application is a national stage entry of International (PCT) Patent Application Number PCT/IB2022/056542, filed Jul. 15, 2022, which claims priority to Chinese Utility Model Application No. CN202121613803.6 filed Jul. 15, 2021, the entire disclosures of which are expressly incorporated by reference herein.

Additionally, the present application is related to Chinese Utility Model Application Number No. CN202121614976.X, filed Jul. 15, 2021; Chinese Utility Model Application No. CN202121613882.0, filed Jul. 15, 2021; Chinese Patent Application No. CN202110800425.0, filed Jul. 15, 2021; Chinese Utility Model Application No. CN202121613986.1, filed Jul. 15, 2021; Chinese Patent Application No. CN202110801708.7, filed Jul. 15, 2021; and Chinese Utility Model Application No. CN202121618990.7, filed Jul. 15, 2021, the entire disclosures of which are expressly incorporated by reference herein.

FIELD

The present disclosure relates to the technical field of massage pool accessories, in particular to an air connection piping device for a massage pool, a pool body of a massage pool, and a massage pool.

BACKGROUND

CN112502498A discloses a massage pool and its airway unit, an airway system, and a pool body. The airway unit of the massage pool has a ventilation portion, a first air connection portion and a first attachment structure that can be detachably connected to the massage pool. The pool body of the massage pool is formed with an air cavity and has a second air connection port. The pool body surrounds to form a pool cavity. The pool body is further provided with another second air connection port that can be connected to the pool cavity and cooperate with the pool cavity to generate massage bubbles. Through the assembling and disassembling connection between the first attachment structure and the massage pool, the two first air connection ports can be connected to the massage pool synchronously or removed from the massage pool synchronously. During use the air pump can inflate the water cavity of the massage pool to achieve massage through a first air connection port and a second air connection port, and can inflate and deflate the air cavity of the massage pool by another first air connection port and another second air connection port.

SUMMARY

In an exemplary embodiment of the present disclosure, an air connection pipeline device of a massage pool, a massage pool body, and/or a massage pool are provided.

In another exemplary embodiment, an air connection pipeline device of a massage pool is provided. The air connection pipeline device comprises a pipeline. The pipeline is formed with a first air connection passage and a second air connection passage. The first air connection passage has a first air inlet and a first air outlet. The first air connection passage is provided with a check valve located between the first air inlet and the first air outlet. The check valve is driven to open when the air flow moves from the first air inlet to the first air outlet and close when flow is reversed. The second air connection passage is provided with a switch valve. The switch valve comprises a second valve core and a second elastic body. The second valve core slides between a closed position to close the second air connection passage and an open position to open the second air connection passage. The second elastic body presses against the second valve core. The initial state of the second valve core is the closed position.

In an example thereof, the first air inlet of the first air connection passage and a ventilation port of the second air connection passage are located at the first port of the pipeline. The first air outlet of the first air connection passage is located at the second port of the pipeline. The other ventilation port of the second air connection passage is located on the peripheral wall of the pipeline.

In another example thereof, the first air inlet is in an annular structure surrounding the first ventilation port.

In a further example thereof, the second port of the pipeline is recessed to form an installation cavity. The installation cavity constitutes a part of the first air connection passage, and a cavity hole of the installation cavity constitutes the first air outlet. The check valve is installed in the installation cavity.

In yet another example thereof, the first air connection passage further has an air connection section. The air connection section is connected to the first air inlet and the installation cavity. The connection of the air connection section and the installation cavity constitutes a control port. The check valve has a first valve core that can slide relative to the first air connection passage and a first elastic body that pushes against the first valve core. The first valve core and the control port are cooperated to each other.

In still another example thereof, the check valve further comprises a first valve base. The first valve base is fixedly installed in the installation cavity and has a first air passage arranged therethrough. The first valve core is slidably connected to the first valve base. The first elastic body abuts between the first valve base and the first valve core.

In yet a further example thereof, the second air connection passage is provided with a constriction. The second valve core has a installation base, a protruding section fixed in the front of the installation base and a sealing portion that can be detached and fixed on the protruding section. The protruding section passes through the constriction from the outside to the inside. The sealing portion is located inside the constriction. The sealing portion and the constriction cooperate to control the switch valve. The second elastic body abuts between the installation base and the outer side of the constriction. A second air passage for air flow is provided between the installation base and the second air connection passage, and between the protruding section and the constriction.

In still yet a further example thereof, an annular apron is further fixed outside the pipeline, and an opening formed between the apron and the pipeline faces the annular cavity at the first end of the pipeline.

In yet a further exemplary embodiment of the present disclosure, a pool body of a massage pool is provided. The pool body comprising a pool wall. The pool wall surrounds to form a water cavity for filling water, and an air cavity is formed in the pool wall. The pool body further comprises the air connection pipeline of a massage pool. A first air outlet of a first air connection passage of the air connection pipeline is connected to the water cavity and a second air outlet of a second air connection passage of the air connection pipeline is connected to the air cavity.

In still a further exemplary embodiment of the present disclosure, a massage pool is provided. The massage pool comprising an airway system and a pool body. The airway system and an air connection pipeline device of the massage pool are assembled together. When a second valve that is assembled with the switch valve of the air connection pipeline and abuts against the switch valve of the air connection pipeline is at the open position, the airway system is connected to a first air inlet of the first air connection passage the air connection pipeline and a second air connection passage of the air connection pipeline.

BRIEF DESCRIPTION OF DRAWINGS

The foregoing aspects and many of the intended advantages of this disclosure will become more readily appreciated as the same becomes better understood by reference to the following detailed description when taken in conjunction with the accompanying drawings.

Figure 1:
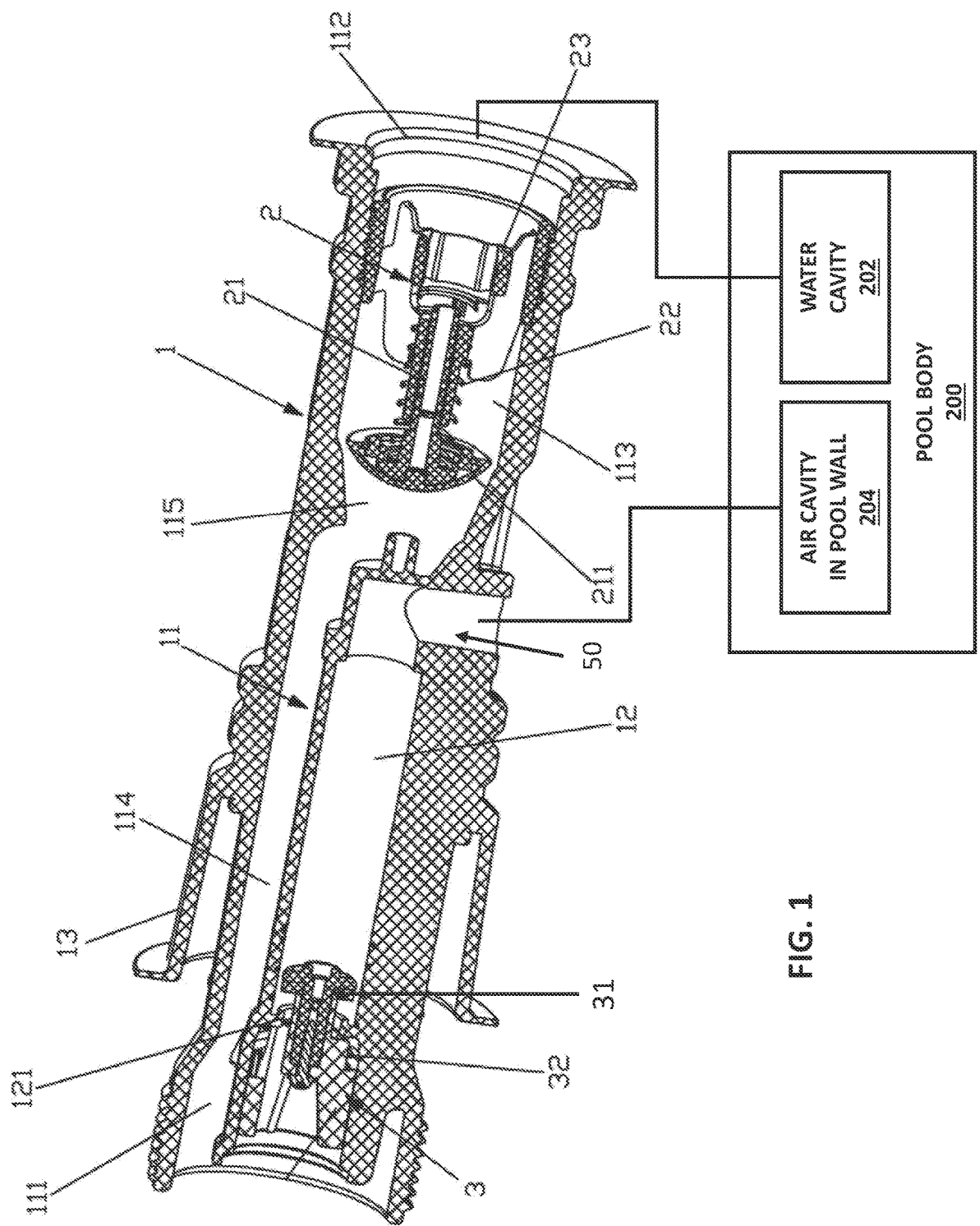
FIG. 1 illustrates a schematic cross-sectional view of an air connection pipeline device in a massage-inflating state.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplifications set out herein illustrate embodiments of the disclosure, and such exemplifications are not to be construed as limiting the scope of the disclosure in any manner.

DETAILED DESCRIPTION OF THE DRAWINGS

For the purposes of promoting an understanding of the principals of the disclosure, reference will now be made to the embodiments illustrated in the drawings, which are described below. The embodiments disclosed below are not intended to be exhaustive or limit the disclosure to the precise form disclosed in the following detailed description. Rather, the embodiments are chosen and described so that others skilled in the art may utilize their teachings. It will be understood that no limitation of the scope of the disclosure is thereby intended. The disclosure includes any alterations and further modifications in the illustrative devices and described methods and further applications of the principles of the disclosure which would normally occur to one skilled in the art to which the disclosure relates.

In the description, it should be noted that the terms upper, lower, inner, outer, top/bottom, etc. indicating the orientation or positional relationship based on the orientation shown in the drawings are only for the convenience of simplifying the description, rather than indicating or implying that the pointed device or element must have a specific orientation, be constructed and operated in a specific orientation, and therefore cannot be understood as a limitation of the present disclosure. In addition, the terms first and second are only used for descriptive purposes, and cannot be understood as indicating or implying relative importance.

The terms "couples", "coupled", "coupler", and variations thereof are used to include both arrangements wherein two or more components are in direct physical contact and arrangements wherein the two or more components are not in direct contact with each other (e.g., the components are "coupled" via at least a third component, but yet still cooperates or interact with each other).

The airway connection pipeline and related components and systems disclosed in this present disclosure are related to the devices and systems disclosed in the following applications: PCT Patent Application No. PCT/IB2022/056545, filed Jul. 15, 2022, titled AN AIRWAY SYSTEM OF A MASSAGE POOL, COMPRISES AN AIR PUMP AND AN AIRWAY UNIT, PCT Patent Application No. PCT/IB2022/056556, filed Jul. 15, 2022, titled AIRWAY STRUCTURE OF A MASSAGE POOL WITH COMPENSATION FUNCTION AND A MASSAGE POOL, PCT Patent Application No. PCT/IB2022/056536, filed Jul. 15, 2022, titled AN AIRWAY STRUCTURE OF A MASSAGE POOL WITH A CONTROL VALVE, the entire disclosures of which are expressly incorporated by reference herein.

Embodiment 1

Referring to FIGS. 1-6, the air connection pipeline device of a massage pool comprises a pipeline 1. The pipeline 1 is formed with a first air connection passage 11 and a second air connection passage 12. The first air connection passage 11 has a first air inlet 111 and a first air outlet 112. The first air connection passage 11 is provided with a check valve 2 between the first air inlet 111 and the first air outlet 112. The check valve 2 is driven to open when the air flows from the first air inlet 111 to the first air outlet 112 and is driven to close when reversely. The check valve 2 is opened by the impact of air flow during air intake, and the water flow cannot flow out in reverse. The second air connection passage 12 is provided with a switch valve 3. The switch valve 3 comprises a second valve core 31 and a second elastic body 32. The second valve core 31 slides relative to the second air connection passage 12 between a closed position for closing the second air connection passage 12 and an open position for opening the second air connection passage 12. The second elastic body 32 presses against the second valve core 31 and the initial state of the second valve core 31 is the closed position, then when the pipeline device 1 and the airway system are connected, the second valve core 31 is driven to be in the open position by the airway system (the airway system presses on the second valve core 31 to move it to the open position), and after disassembly, the second valve core 31 is driven to return to the closed position under the elastic force of the second elastic body 32, so as to prevent the air of the air cavity from being discharged after disassembly, so as to improve the convenience of use.

The first air inlet 111 of the first air connection passage 11 and a ventilation port of the second air connection passage 12 are located at the first port of the pipeline 1. The first air outlet 112 of the first air connection passage 11 is located in second port of the pipeline 1, the other ventilation port 50 of the second air connection passage 12 is located on the peripheral wall of the pipeline 1, so it is convenient to install it in the pool body, easy to connect to the airway system, and enhance the air tightness of the airway. Therein, the first air inlet 111 has an annular structure surrounding the first air outlet, which facilitates the installation of pipelines and airway systems.

The second port of the pipeline 1 is recessed to form an installation cavity 113. The installation cavity 113 constitutes a part of the first air connection passage 11 and the cavity hole of the installation cavity 113 constitutes the first air outlet 112. The first air connection passage 11 further has an air connection section 114, which is connected to the first air inlet 111 and the installation cavity 113. The connection between the air connection section 114 and the installation cavity 113 constitutes a control port 115, which is convenient for assembling the check valve. The check valve 2 is installed in the installation cavity 113. The check valve 2 is provided with a first valve core 21 that is slidable with respect to the first air connection passage 11, a first elastic body 22 abutting against the first valve core 21 and a first valve base 23. The first valve base 23 is fixedly installed in the installation cavity 113 and has a first air passage arranged therethrough. The first valve core 21 is slidably connected to the first valve base 23 and the first elastic body 22 abuts between the first valve base 23 and the first valve core 21, and the structure is simple and compact. The first valve core 21 has a sealing ring 211 with a conical structure, and the control port 115 is in a conical structure. The check valve is controlled through the cooperation of the sealing ring 211 and the control port 115. When the sealing ring 211 is in contact with the control port 115, the first air connection passage 11 is closed, and when the sealing ring 211 and the control port 115 are isolated (spaced apart), the first air connection passage is opened to enhance airtightness. In embodiments, the specific structure of the valve base 23 comprises an outer ring screwed into the installation cavity 113 and an inner ring fixed in the outer ring through spokes. A first air passage is formed between the two adjacent spokes, and the inner ring is fixed with a fixed sleeve. The first valve core 21 is slidably connected in the fixed sleeve. The first elastic body is sleeved on the fixed sleeve and pressed against the inner ring and fixedly protruding on the flange of the first valve core. The sealing ring is fixed on the end of the first valve core.

Figure 2:
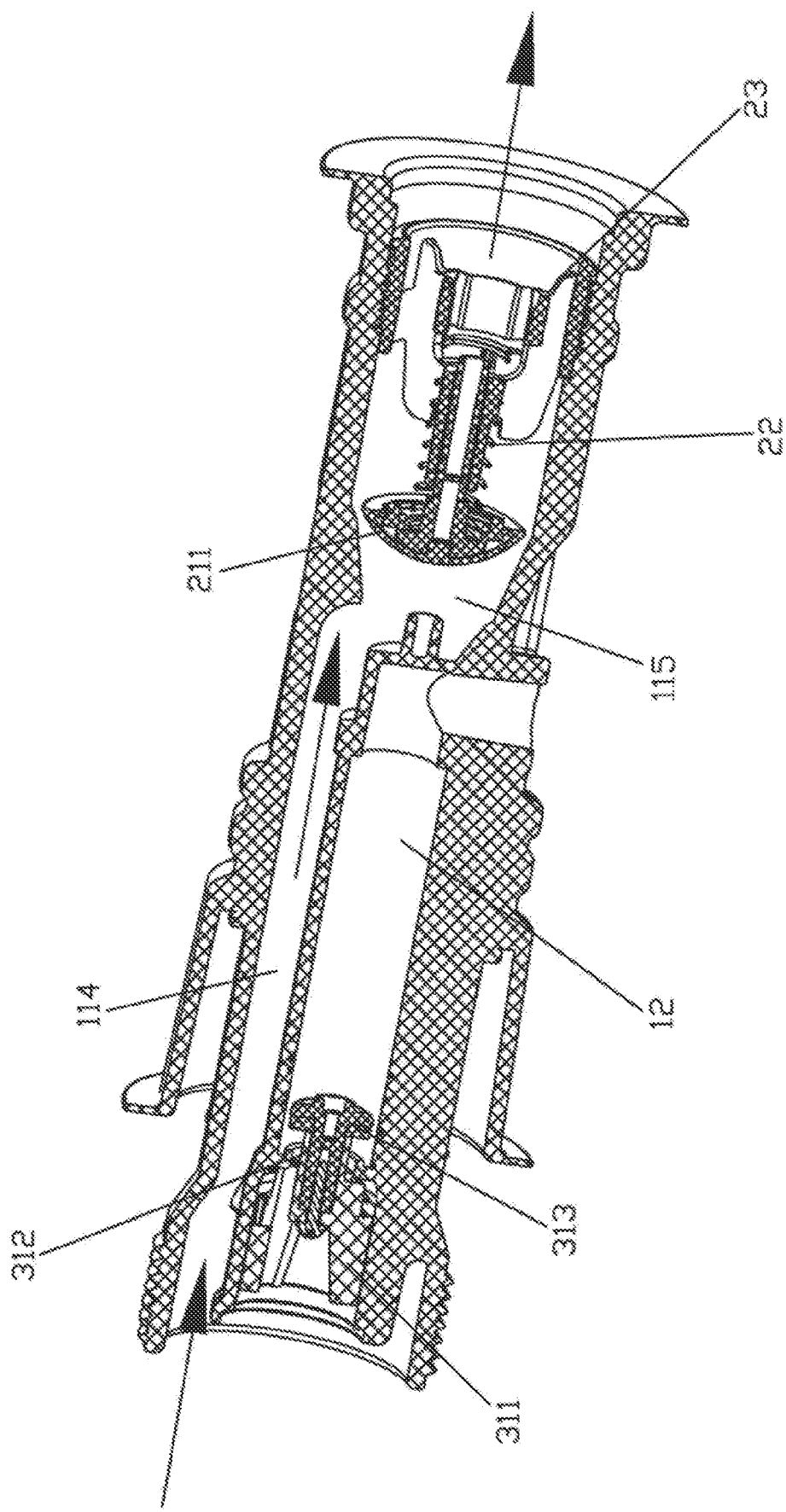
FIG. 2 illustrates an airway view of the air connection pipeline device according of FIG. 1 in a massage-inflating state.
Figure 3:
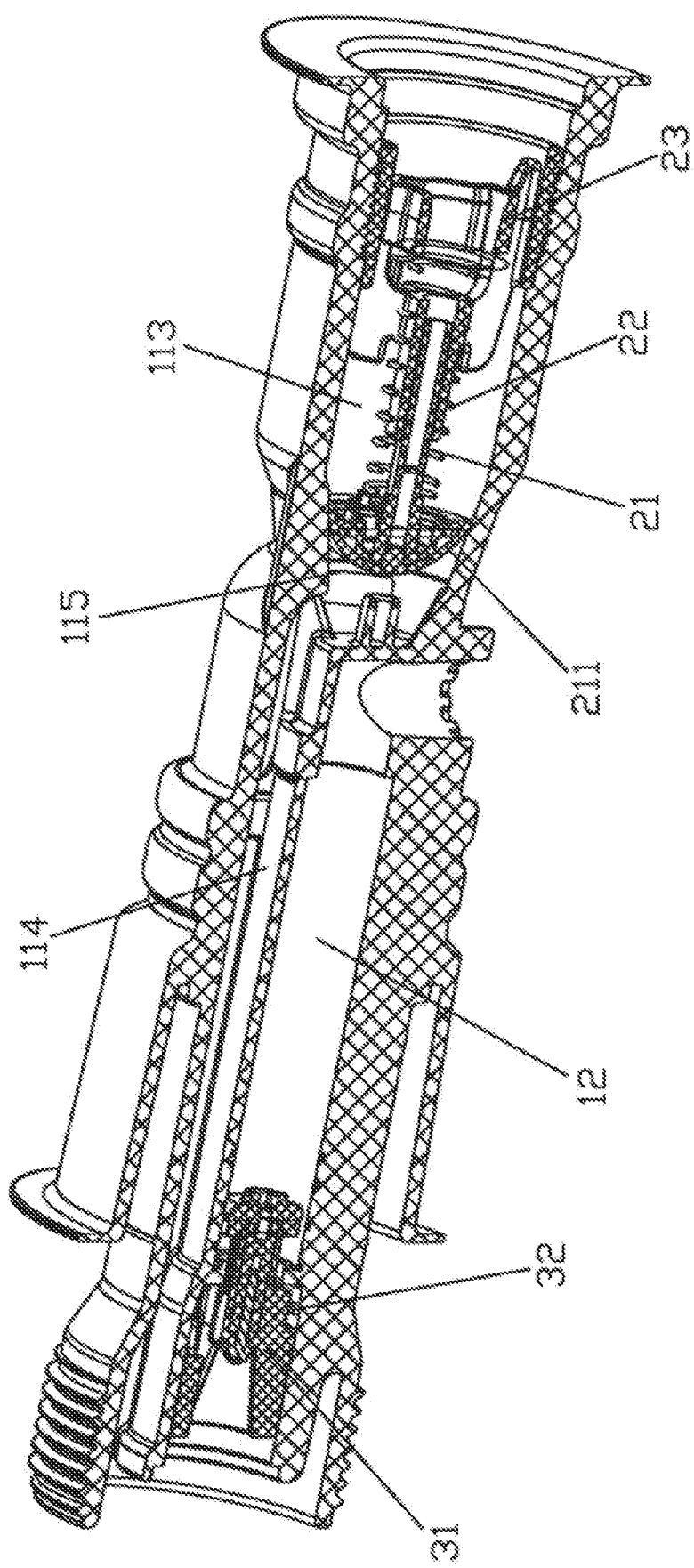
FIG. 3 illustrates a schematic cross-sectional view of the air connection pipeline device of FIG. 1 in a state that the air cavity is inflated.
Figure 4:
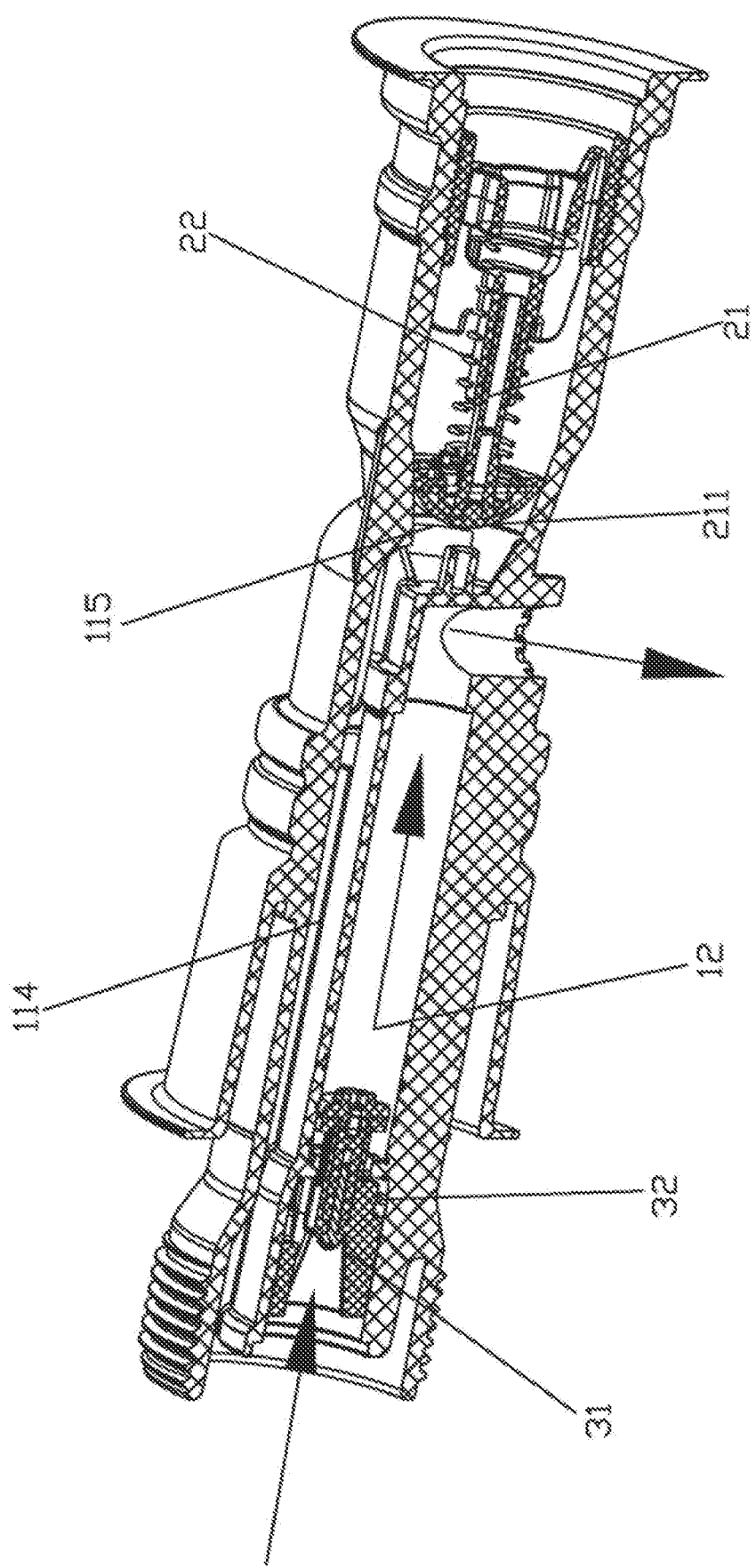
FIG. 4 illustrates an airway view of the air connection pipeline device of FIG. 1 in a state that the air cavity is inflated.
Figure 5:
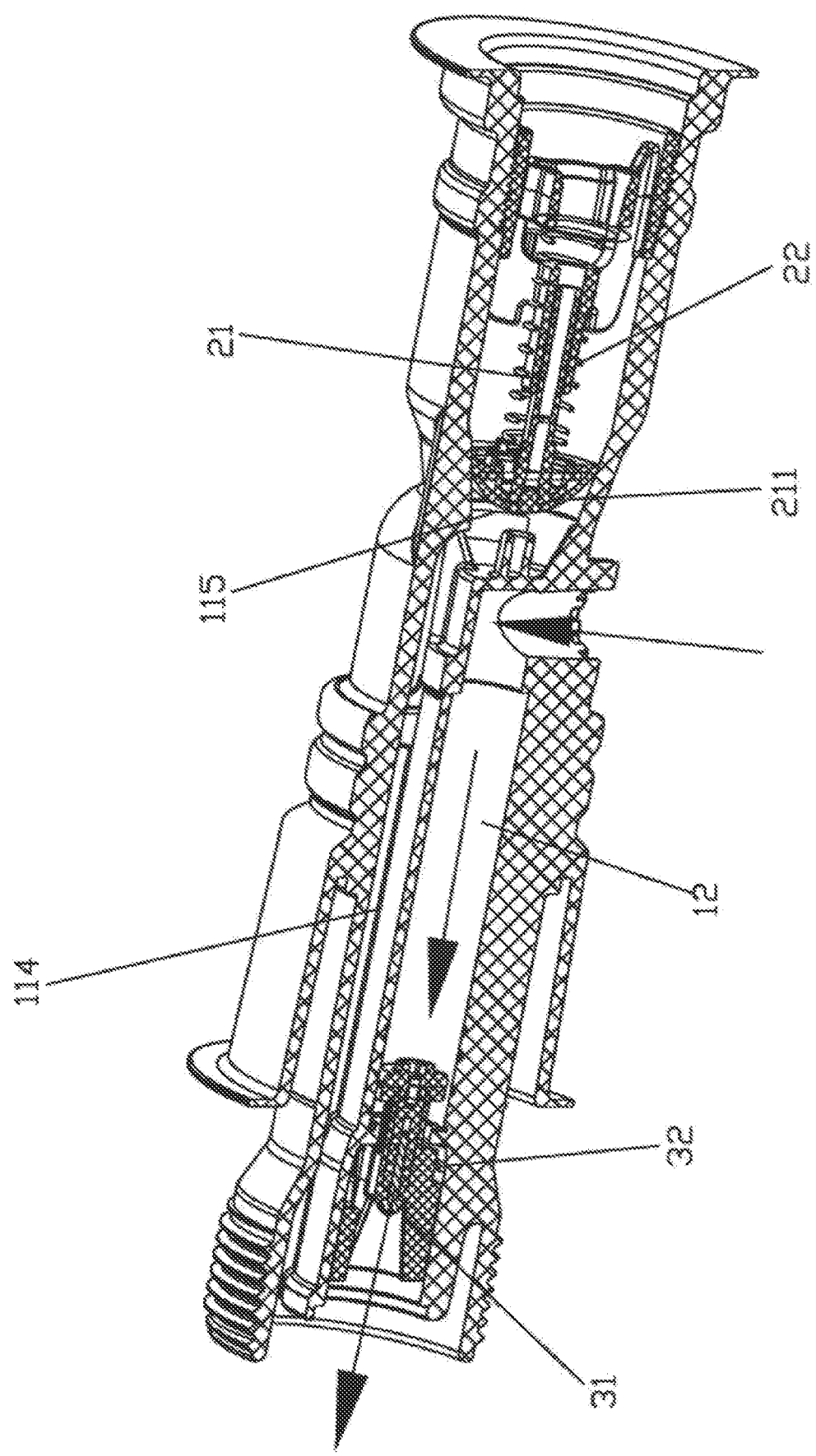
FIG. 5 illustrates an airway view of the air connection pipeline device of FIG. 1 in a state of deflating the air cavity.
Figure 6:
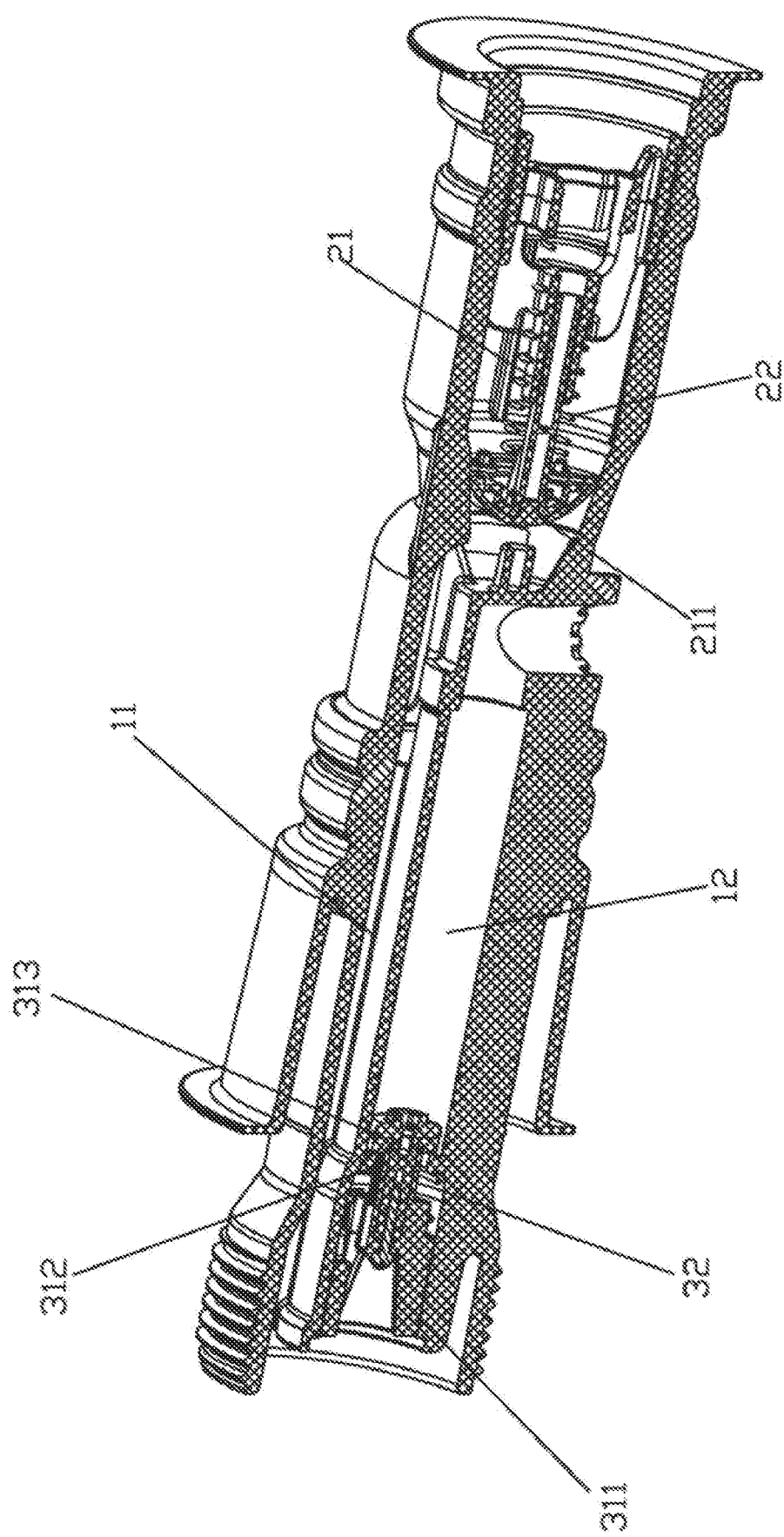
FIG. 6 illustrates a schematic cross-sectional view of the air connection pipeline device of FIG. 1 in a closed state.

The second air connection 12 is provided with a constriction 121. Referring to FIG. 2, the second valve core 31 has an installation base 311, a protruding section 312 fixed in front of the installation base 311, and a sealing portion 313 that can be detached and fixed on the protruding section 312. The protruding section 312 passes through the constriction 121 from the outside to the inside. The sealing portion 313 is located inside the constriction 121. The sealing portion 313 and the constriction 121 cooperate to control the switch of the switch valve 3. When the sealing portion 313 is in contact with the inner side of the constriction 121, the switch valve 3 is closed, the sealing portion 313 and the inner side of the constriction 121 are isolated and opened, and the second elastic body 32 abuts between the installation base 311 and the outer side of the constriction 121 to make the initial state in the closed position. A second air passage for the air to pass through is arranged between the installation base 311 and the second air connection passage 12 and between the protruding section and the constriction. The structure is simple and compact, and is easy to install and assemble. The disassembly and assembly of the connection is such as to be fixed by screws.

An annular apron 13 is further fixed outside the pipeline 1. The opening formed between the apron 13 and the pipeline 1 faces the annular cavity at the first end of the pipeline 1. The above structure can utilize the elasticity generated by the apron 13 to improve the installation strength and firmness.

Embodiment 2

A pool body 200 of a massage pool comprises a pool wall and the air connection pipeline device 1 of the massage pool. The pool wall surrounds to form a water cavity 202 for filling water, and an air cavity 204 is formed in the pool wall. The first air outlet 112 of the first air connection passage 11 is connected to water cavity 202. The ventilation port 50 of the second air connection passage 12 is connected to the air cavity 204.

Embodiment 3

The massage pool comprises an airway system and a massage pool body 200. The airway system and the air connection pipeline device 1 of a massage pool are assembled together. The airway system includes an air pump to provide pressurized air to the air connection pipeline. An exemplary airway system is disclosed in PCT Patent Application No. PCT/IB2022/056545, filed Jul. 15, 2022, titled AN AIRWAY SYSTEM OF A MASSAGE POOL, COMPRISES AN AIR PUMP AND AN AIRWAY UNIT, the entire disclosure of which is expressly incorporated by reference herein. The second valve core of the airway system abutting on the switch valve the air connection pipeline device 1 is at the open position through the above-mentioned assembly. The airway system connects the first air inlet of the first air connection passage and the second air connection passage. The airway system and the pool body are assembled together, and the switch valve is in an open state at this time. When the airway system supplies air to the first air connection passage, the check valve 2 is opened by the air flow, and the air flow is transported to the water cavity 202 to achieve massage, the pool is in a massage-inflating state. When the airway system supplies air to the second air connection passage, the air is inflated to the air cavity 204 through the first air connection passage 12, the check valve 2 is closed at this time, and the air cavity 204 is in an inflating state. When the airway system draws air to the second air connection passage, the air cavity is exhausted through the first air connection passage, the check valve is closed at this time, and the air cavity is in a deflating state.

Examples

Example 1. An air connection pipeline device of a massage pool may comprise a pipeline. The pipeline may be formed with a first air connection passage and a second air connection passage. The first air connection passage may have a first air inlet and a first air outlet. The first air connection passage may include a check valve located between the first air inlet and the first air outlet. The check valve may be driven to open when the air flow moves from the first air inlet to the first air outlet and close when reversely. The second air connection passage may be provided with a switch valve. The switch valve may comprise a second valve core and a second elastic body. The second valve core may slide between a closed position to close the second air connection passage and an open position to open the second air connection passage. The second elastic body may press against the second valve core. An initial state of the second valve core may be the closed position.

Example 2. The air connection pipeline device of a massage pool according to Example 1, wherein the first air inlet of the first air connection passage and a ventilation port of the second air connection passage may be located at a first port of the pipeline. The first air outlet of the first air connection passage may be located at a second port of the pipeline. A ventilation port of the second air connection passage may be located on a peripheral wall of the pipeline.

Example 3. The air connection pipeline device of Example 2, wherein the ventilation port of the second air connection passage may be located along a side of the pipeline between the first port of the pipeline and the second port of the pipeline.

Example 4. The air connection pipeline device of any of Examples 2 and 3, wherein the ventilation port of the second air connection passage may be located longitudinally between the first port of the pipeline and the check valve of the pipeline.

Example 5. The air connection pipeline device of any of the preceding Examples, wherein the first air connection passage may be not in fluid communication with the second air connection passage.

Example 6. The air connection pipeline device of any of the preceding Examples, wherein the check valve and the switch valve may be generally positioned along a central longitudinal axis of the pipeline.

Example 7. The air connection pipeline device of any of Examples 2-6, wherein the first air inlet may be in an annular structure surrounding the first ventilation port.

Example 8. The air connection pipeline device of any of Examples 2-7, wherein the second port of the pipeline may be recessed to form an installation cavity. The installation cavity may constitute a part of the first air connection passage. A cavity hole of the installation cavity may constitute the first air outlet. The check valve may installed in the installation cavity.

Example 9. The air connection pipeline device of Example 8, wherein the first air connection passage further may have an air connection section. The air connection section may be connected to the first air inlet and the installation cavity. The connection of the air connection section and the installation cavity may constitute a control port. The check valve has a first valve core that may slide relative to the first air connection passage and a first elastic body that may push against the first valve core. The first valve core and the control port may cooperate to seal the first air connection passage in a first position of the first valve core.

Example 10. The air connection pipeline device of Example 9, wherein the check valve may further comprise a first valve base. The first valve base may be fixedly installed in the installation cavity and may have a first air passage arranged therethrough. The first valve core may be slidably connected to the first valve base. The first elastic body may abut between the first valve base and the first valve core.

Example 11. The air connection pipeline device of any of Examples 1-10, wherein the second air connection passage may be provided with a constriction. The second valve core may have an installation base, a protruding section fixed in the front of the installation base and a sealing portion that can be detached and fixed on the protruding section. The protruding section may pass through the constriction from the outside to the inside. The sealing portion may be located inside the constriction. The sealing portion and the constriction may cooperate to control the switch valve. The second elastic body may abut between the installation base and the outer side of the constriction. A second air passage for air flow may be provided between the installation base and the second air connection passage and between the protruding section and the constriction.

Example 12. The air connection pipeline device according to any of Examples 1-11, wherein an annular apron may be further fixed outside the pipeline. An opening may be formed between the apron and the pipeline faces an annular cavity at the first end of the pipeline.

Example 13. A pool body of a massage pool may comprise a pool wall. The pool wall may form a water cavity for filling water. An air cavity may be formed in the pool wall. The pool body may further comprise the air connection pipeline according to any one of Examples 1-12. The first air outlet of the air connection pipeline may be connected to the water cavity. The second air connection passage of the air connection pipeline may be connected to the air cavity.

Example 14. A massage pool may comprise an airway system and the pool body according to Example 13. The airway system and the air connection pipeline device of a massage pool may be assembled together. When a valve of the airway system that is assembled with the switch valve and abuts against the switch valve is at the open position, the airway system may be connected to the first air inlet of the first air connection passage and the second air connection passage. The airway system may provide pressurized air to the first air connection passage, the second air connection passage, or both.

It will be apparent to those skilled in the art that various modifications and variation can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. An air connection pipeline device of a massage pool, comprising:
   a pipeline, the pipeline is formed with a first air connection passage and a second air connection passage; wherein the first air connection passage has a first air inlet and a first air outlet, the first air connection passage includes a check valve located between the first air inlet and the first air outlet, the check valve is driven to open when the air flow moves from the first air inlet to the first air outlet and close when the air flow moves from the first air outlet to the first air inlet; the second air connection passage is provided with a switch valve, the switch valve comprises a second valve core and a second elastic body, the second valve core slides between a closed position to close the second air connection passage and an open position to open the second air connection passage, the second elastic body presses against the second valve core, and an initial state of the second valve core is the closed position, wherein the first air inlet of the first air connection passage and a ventilation port of the second air connection passage are located at a first port of the pipeline, the first air outlet of the first air connection passage is located at a second port of the pipeline, and the ventilation port of the second air connection passage is located on a peripheral wall of the pipeline.

2. The air connection pipeline device of claim 1, wherein the ventilation port of the second air connection passage is located along a side of the pipeline between the first port of the pipeline and the second port of the pipeline.

3. The air connection pipeline device of claim 1, wherein the ventilation port of the second air connection passage is located longitudinally between the first port of the pipeline and the check valve of the pipeline.

4. The air connection pipeline device of claim 1, wherein the first air connection passage is not in fluid communication with the second air connection passage.

5. The air connection pipeline device of claim 1, wherein the check valve and the switch valve are generally positioned along a central longitudinal axis of the pipeline.

6. The air connection pipeline device of claim 1, wherein the first air inlet is in an annular structure surrounding the first ventilation port.

7. The air connection pipeline device of claim 1, wherein the second port of the pipeline is recessed to form an installation cavity, the installation cavity constitutes a part of the first air connection passage, and a cavity hole of the installation cavity constitutes the first air outlet, the check valve is installed in the installation cavity.

8. The air connection pipeline device of claim 7, wherein the first air connection passage further has an air connection section, and the air connection section is connected to the first air inlet and the installation cavity, and the connection of the air connection section and the installation cavity constitutes a control port; the check valve has a first valve core that can slide relative to the first air connection passage and a first elastic body that pushes against the first valve core, the first valve core and the control port cooperate to seal the first air connection passage in a first position of the first valve core.

9. The air connection pipeline device of claim 8, wherein the check valve further comprises a first valve base, and the first valve base is fixedly installed in the installation cavity and has a first air passage arranged therethrough, the first valve core is slidably connected to the first valve base, and the first elastic body abuts between the first valve base and the first valve core.

10. The air connection pipeline device of claim 1, wherein the second air connection passage is provided with a constriction, and the second valve core has an installation base, a protruding section fixed in the front of the installation base and a sealing portion that can be detached and fixed on the protruding section, the protruding section passes through the constriction from the outside to the inside, the sealing portion is located inside the constriction, and the sealing portion and the constriction cooperate to control the switch valve, the second elastic body abuts between the installation base and the outer side of the constriction, a second air passage for air flow is provided between the installation base and the second air connection passage, and between the protruding section and the constriction.

11. The air connection pipeline device of claim 1, wherein an annular apron is further fixed outside the pipeline, and an opening formed between the apron and the pipeline faces an annular cavity at the first end of the pipeline.

12. A pool body of a massage pool, comprising a pool wall, the pool wall surrounds to form a water cavity for filling water, and an air cavity is formed in the pool wall; wherein the pool body further comprises the air connection pipeline of claim 1, the first air outlet of the air connection pipeline is connected to the water cavity, and the second air connection passage of the air connection pipeline is connected to the air cavity.

13. A massage pool, wherein comprising an airway system and the pool body according to claim 12, the airway system and the air connection pipeline device of a massage pool are assembled together, and when a valve of the airway system that is assembled with the switch valve and abuts against the switch valve is at the open position, the airway system is connected to the first air inlet of the first air connection passage and the second air connection passage.

* * * * *